United States Patent [19]
Vecellio et al.

[11] Patent Number: 5,397,267
[45] Date of Patent: Mar. 14, 1995

[54] ONE-PIECE ADJUSTABLE DISCHARGE REGISTER

[76] Inventors: Anthony M. Vecellio, 3007 Elmhurst; Benjamin L. Schwegman, 2009 Northwood Blvd., both of Royal Oak, Mich. 48073

[21] Appl. No.: 110,869

[22] Filed: Aug. 24, 1993

[51] Int. Cl.$^6$ .............................................. B60H 1/34
[52] U.S. Cl. .................................... 454/155; 454/316; 454/318; 454/319; 454/320
[58] Field of Search ............... 454/109, 155, 315, 316, 454/318, 319, 320, 202

[56] References Cited

U.S. PATENT DOCUMENTS

| | | | |
|---|---|---|---|
| 3,735,691 | 5/1973 | Gofton et al. | 454/319 |
| 3,780,640 | 12/1973 | Fruth | 454/315 |
| 4,345,510 | 8/1982 | Sterett | 454/315 |
| 5,046,406 | 9/1991 | Harris et al. | 454/313 |

FOREIGN PATENT DOCUMENTS

| | | | |
|---|---|---|---|
| 91142 | 7/1981 | Japan | 454/155 |
| 83839 | 4/1986 | Japan | 454/155 |
| 231345 | 10/1986 | Japan | 454/313 |

OTHER PUBLICATIONS

Photograph of multiple-piece ventilation discharge register (assembled and disassembled).

*Primary Examiner*—Harold Joyce
*Attorney, Agent, or Firm*—Harness, Dickey & Pierce

[57] ABSTRACT

A one-piece adjustable air discharge register is of a generally clamshell-type of construction having a number of air-directing vanes formed integrally therein with the discharge register being adapted for pivotal mounting in an air discharge opening for adjustment of the flow of discharge air in a first adjustment direction. The discharge register also has a number of pivotally movable air-directing louvers formed integrally therein for adjustment of discharge airflow in a second adjustment direction transverse to, and independent of, the first adjustment direction. The one-piece discharge register includes an integral frame portion for supporting the movable louvers, with a number of sets of living hinges being integrally formed with the frame portion, the fixed vanes, and the movable louvers, in order to allow the register to be molded as a single, one-piece device and assembled in a simple one-step operation.

20 Claims, 6 Drawing Sheets

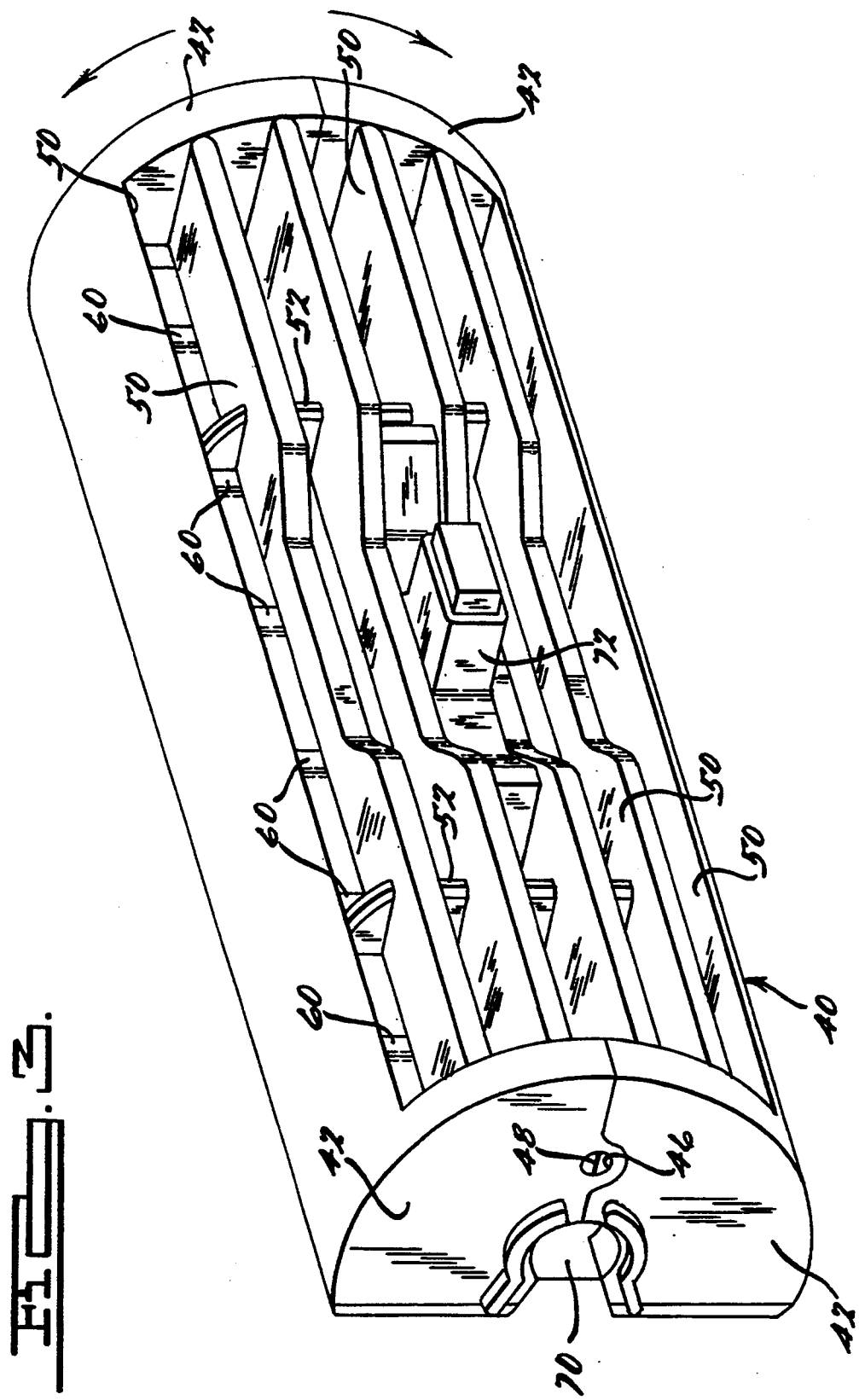

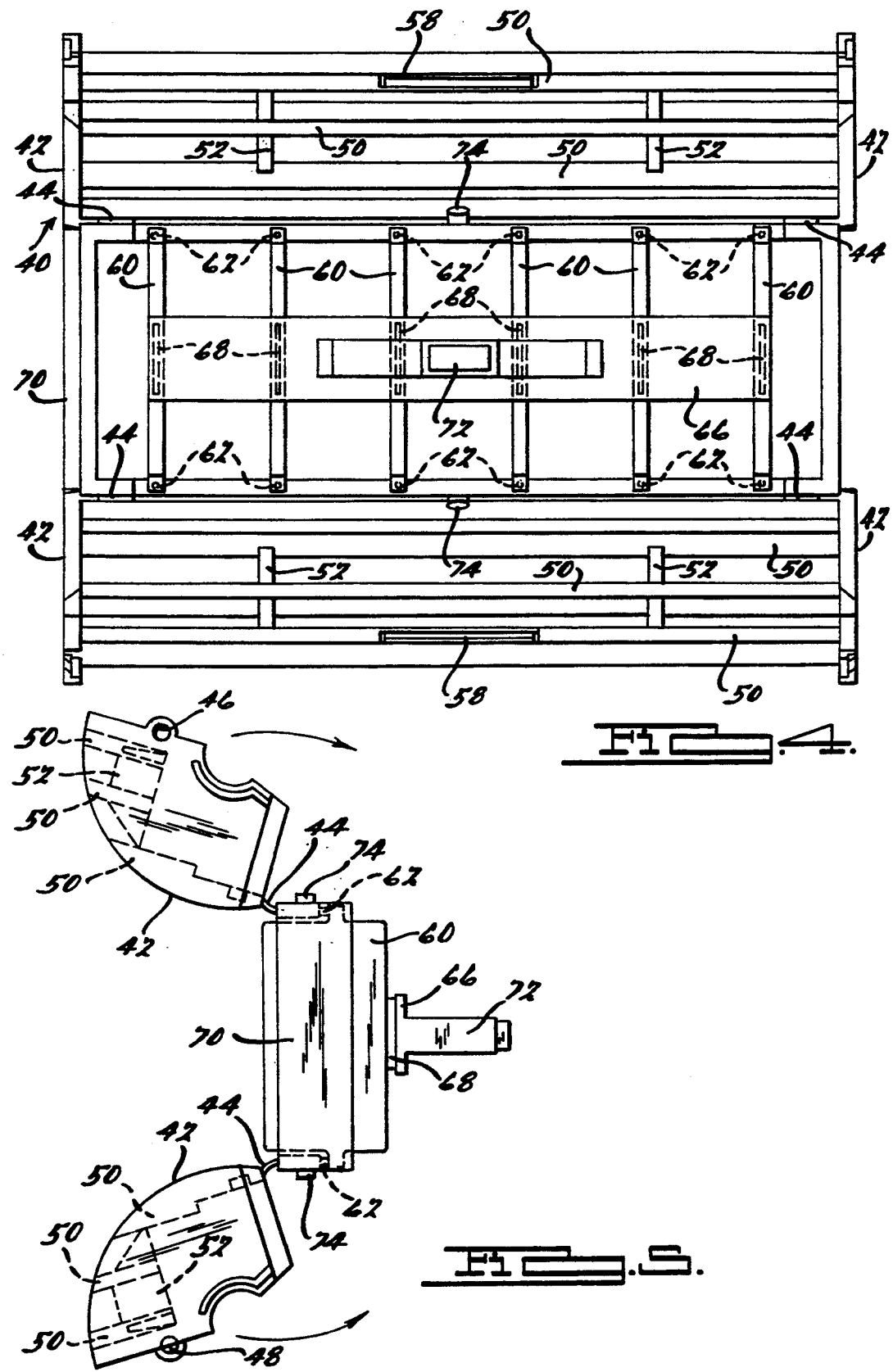

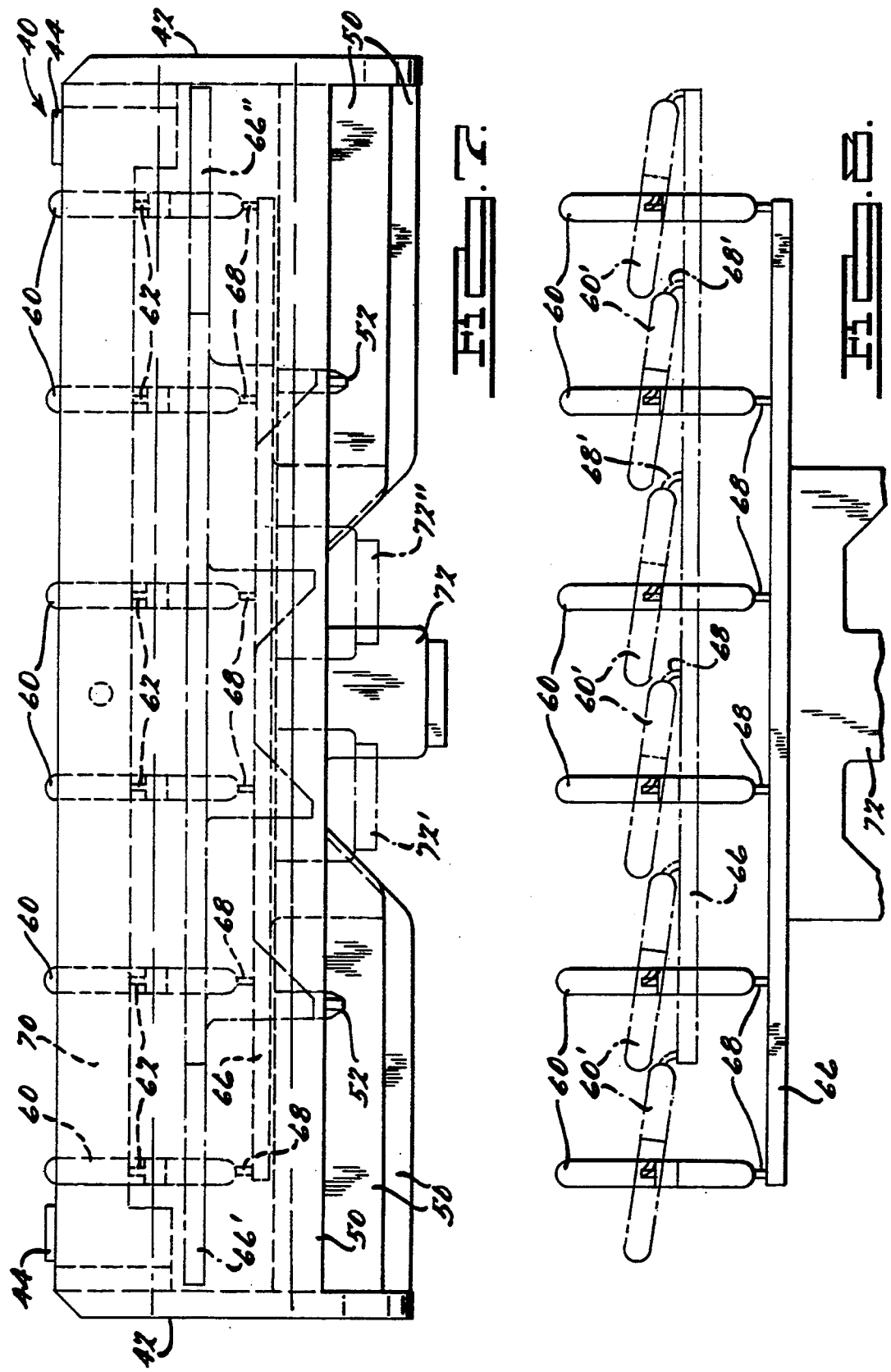

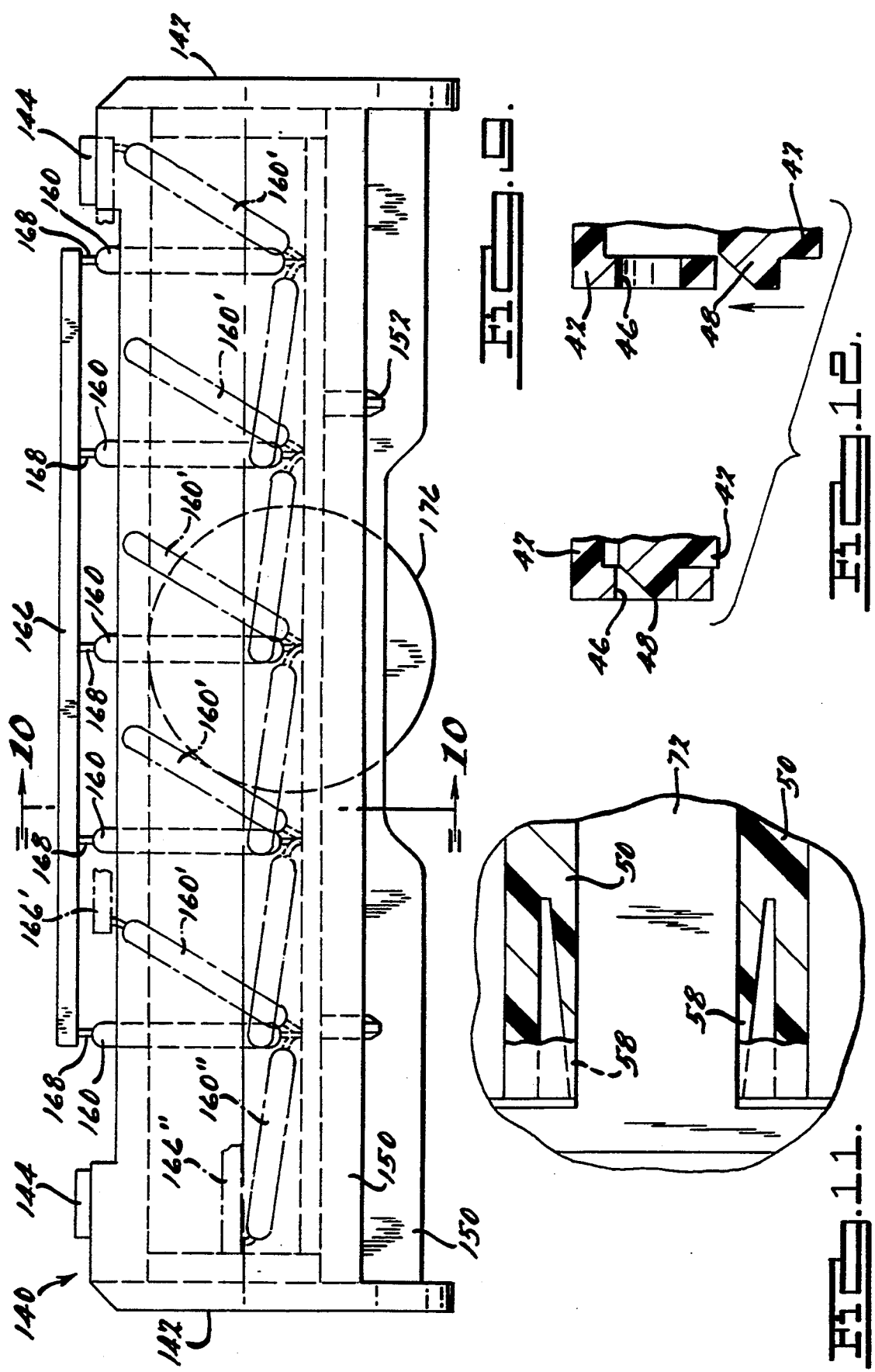

ONE-PIECE ADJUSTABLE DISCHARGE REGISTER

BACKGROUND AND SUMMARY OF THE INVENTION

The present invention relates generally to an adjustable air discharge register for a heating, ventilating or air conditioning system, with the discharge register being movable in at least two adjustment directions for purposes of selectively directing air flow. More specifically, the present invention is directed toward a one-piece adjustable discharge register that is especially adapted and well-suited for interior applications in land, marine or air-borne vehicles.

Adjustable air discharge registers are well-known in automobile or other vehicle interior components for directing heated or cooled outlet air into desired areas in order to enhance the comfort of the vehicle occupants. Such registers typically include a number of fixed vanes oriented in a generally parallel relationship with one another, with the entire discharge register being pivotally movable so that the vanes can deflect the air flow in a first adjustment direction. A number of louvers are pivotally mounted in a generally parallel relationship with one another and are movable independently of the remainder of the discharge register in order to selectively deflect the airflow in a second adjustment that is transverse to the first discharge direction.

The pivotal movement and adjustment of the louvers are controlled by the operator by grasping and moving either a sliding control knob or a rotary control knob. A linkage member is pivotally attached to the group of louvers in order to cause them to move in unison, in a parallel relationship with one another.

Typically, the components of prior art adjustable discharge registers are inordinately cumbersome and expensive to manufacture and assemble due to the requirement of a large number of manually-accomplished steps in the assembly process, frequently with as many as eighty pick-position-place operations frequently being required to assemble one discharge register unit. It is possible for the assembly process to be at least partially automated. But this requires very complex and costly equipment that must be specifically tailored for each discharge register design. Frequently such equipment is useable for only a relatively short time before model changeovers, requiring expensive reconfiguring or retooling for the equipment to be usable in the assembly of another discharge register design. In some instances, such equipment and tooling conversions to suit different designs is commercially impractical, and new equipment or tooling must be purchased. In addition, the reliability of such specialized equipment and machinery has usually proved to be low due to frequent jamming, dogging, or other failures, thus further contributing to the cost of the products.

These and other disadvantages of currently adjustable discharge registers stem largely from the fact that they are made up of such a large number of separate parts, with many of the parts being substantially different from one another, and thus not interchangeable, due to factors such as the product asymmetry that is necessary in order to assure proper orientation during installation in a vehicle interior panel. In addition, the manufacture of individual adjustable discharge register components typically involves injection molding of plastic components in expensive multiple-cavity molds wherein the molded parts are connected by runner trees. Thus, after expulsion from the mold, each part must be cut or snapped from the runner trees prior to their insertion into the above-discussed automated assembly equipment, or before being manually assembled into the finished product. Thus the cost of purchasing and maintaining such complex molds, and the resultant expense of multi-step automated or manual handling the molded products also contributes to the inordinately high cost of making and assembling current, prior art adjustable discharge registers.

Therefore, in accordance with the present invention, the disadvantages discussed above in connection with multiple-piece adjustable discharge registers are sought to be overcome by providing a one-piece adjustable air discharge register having all of its multitudinous components integrally formed in a single mold with movable cavity walls, and with the various components interconnected for movement, either in use or during a simple one-step assembly process, by way of a number of living hinges interconnecting the various components. By way of such a construction, the one-piece adjustable discharge register can be easily and quickly assembled, with all parts being assured of proper alignments and orientations, but without the expense of a multitude of different molds, without an inordinate number of manually-accomplished operations, and without the need for expensive and largely unreliable, uniquely-specialized, automated equipment.

An exemplary one-piece adjustable air discharge register according to the present invention is of a generally clamshell-type of construction having a number of air-directing vanes formed integrally therein with the discharge register being adapted for pivotal mounting in an air discharge opening for a first selective adjustment of the flow of discharge air in a first adjustment direction. The discharge register also has a number of pivotally movable air-directing louvers formed integrally therein for a second selective adjustment of discharge airflow in a second adjustment direction transverse to, and independent of, the first adjustment direction. The one-piece discharge register includes an integral frame portion for supporting the movable louvers, with a number of living hinges being integrally formed with the frame portion and the movable louvers, in order to allow the louvers to be pivotally moved relative to the frame portion. Preferably, an integral link member is pivotally interconnected with the louvers by way of yet another set of living hinge members integrally formed between the link member and louvers, with the link member maintaining louvers in a generally parallel relationship relative to one another and causing them to move in unison throughout selective adjustable movement of the louvers relative to the frame portion and the rest of the discharge register.

In the preferred, exemplary embodiments of the present invention that are illustrated and discussed herein, two groups of the air-directing vanes are interconnected with one another at each end by end caps, in a generally clamshell-type configuration, thus defining a pair of vane-and-end cap assemblies on each side of the above-mentioned frame portion. Still another set of integrally-formed living hinges interconnect the vane-and-end cap assemblies and the frame portion, thus allowing for hinged pivotal movement of the vane-and-end cap assemblies generally toward each other and inwardly toward the frame portion until they meet and can be snapped together and retained in their final use position.

Thus, by way of such a construction, the production of an adjustable air discharge register according to the present invention is reduced to the molding of a single, one-piece component, and the assembly to the final, use configuration is reduced to a quick and simple, one-step process requiring no expensive or specialized equipment.

If deemed necessary in a particular application of the present invention, a friction clutch feature is included, preferably being located on one or more of the fixed vanes in order to releasably maintain the pivotally movable louvers in any of a number of preselected adjusted positions by frictionally engaging the louver control knob or other member, which can be either a slidable, laterally-movable control member or a pivotal, rotary control member.

Additional objects, advantages, and features of the present invention will become apparent from the following description and appended claims, taken in conjunction with the accompanying drawings.

BRIEF DESCRIPTION OF THE DRAWINGS

FIG. 3 is a perspective view similar to that of FIG. 2, but showing an exemplary embodiment of a vastly improved, one-piece adjustable air discharge register according to the present invention.

FIG. 4 is a pre-assembly top view of the exemplary one-piece adjustable air discharge register of FIG. 3.

FIG. 5 is a pre-assembly end view of the exemplary one-piece adjustable discharge register of FIG. 3.

FIG. 7 is a top view an assembled, exemplary one-piece adjustable discharge air register according to the present invention.

FIG. 8 is a partial, rather schematic view of the one-piece adjustable air discharge register of FIGS. 3 through 7, illustrating the movement of the movable louvers, the link member, and a portion of the actuation knob or member.

FIG. 9 is a top view similar to that of FIG. 7, but illustrating an alternate embodiment of the present invention.

FIG. 11 is an enlarged partial detailed view, a portion of which is shown in cross-section, of the friction clutch feature of a one-piece adjustable air discharge register according to the present invention, with this feature being usable in any embodiment of the invention, if deemed necessary or desirable.

FIG. 12 is a partial, enlarged cross-sectional detail view of the preferred snap-together interlocking mechanism for maintaining a one-piece adjustable air discharge register of the present invention in its assembled, final use position.

DETAILED DESCRIPTION OF THE PREFERRED EMBODIMENTS

The drawings illustrate merely exemplary embodiments of a one-piece adjustable air discharge register according to the present invention with the illustrated exemplary embodiments being especially adapted for vehicular interior applications. One skilled in the art will readily recognize, however, that such embodiments are merely illustrative examples of but a few applications of the principles of the present invention and that these principles are equally applicable to other adjustable air discharge registers of a one-piece, one-step assembly construction. Such skilled artisans will also readily appreciate that the principles of the present invention are equally applicable to discharge register installations other than in vehicle interiors.

Figure 1:
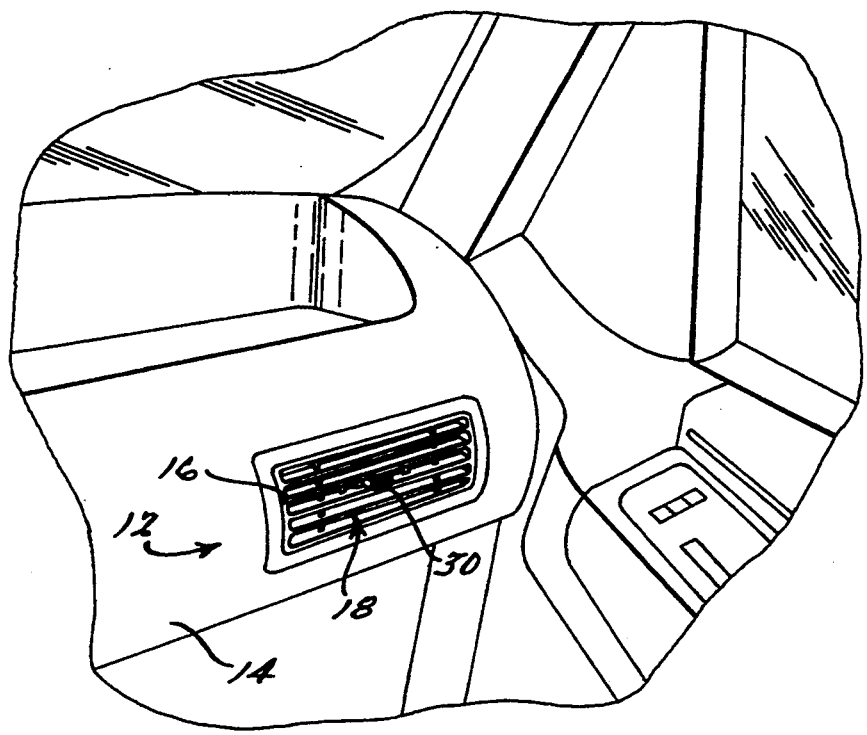
FIG. 1 is a partial view of a vehicle interior having a prior art, multi-piece air discharge register mounted in the instrument panel.
Figure 2:
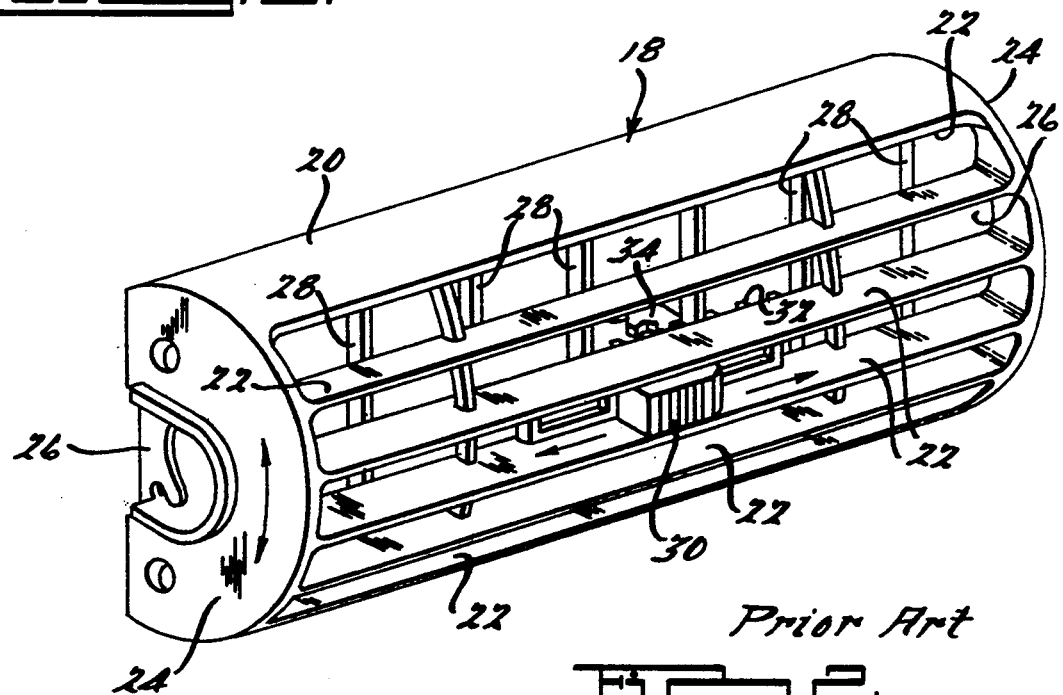
FIG. 2 is a perspective view of the prior art, multi-piece air discharge register of FIG. 1.

FIGS. 1 and 2 illustrate a prior art adjustable air discharge register of the type discussed above. In FIG. 1, a vehicle interior 12 includes an interior panel 14, with a prior art, conventional adjustable air discharge register 18 mounted in an air discharge opening 16.

In FIG. 2, the prior art air discharge register 18 is shown in more detail and includes a number of fixed vanes 22 formed with opposite end plates 24, in order to define a rearwardly-facing cavity into which a box frame 26 is received. A number of pivotally movable louvers 28 are hingedly interconnected with the box frame 26, with the middle louver 29 having a gear portion 34 formed thereon and adapted for meshing engagement with a tooth rack 32 on a control knob member 30. Thus, the prior art adjustable air discharge register 18 is adapted for adjustable, air-directing movement in at least two independent airflow adjustment directions, by way of the vanes 22, which can be reoriented by pivoting the entire discharge register 18 upwardly or downwardly, and by the pivotally movable louvers, which can be used to adjustably deflect the airflow in a side-to-side lateral direction.

Although not specifically shown in the drawings, the pivotally movable components of the prior art register 18 are pivotally mounted or interconnected by way of pivot pins received in pivot apertures. These and other separate components make up the large number of distinct parts requiring assembly into the finished product, typically numbering some ten to twenty separate separate pieces, or even more in some cases. The prior art adjustable air discharge registers of the type illustrated by reference numeral 18 in FIGS. 1 and 2 are thus inordinately expensive to produce and assemble, largely due the complexity and multiplicity of distinct, separate injection-molded parts, which are required to be assembled, either by way of a large number of manually-accomplished pick-and-place operations, or by way of expensive equipment that is complex and specialized in its application.

FIGS. 3 through 12 illustrate exemplary embodiments of a one-piece adjustable air discharge register according to the present invention. As will become apparent from the following discussion, the present invention seeks to overcome the disadvantages outlined above.

In FIGS. 3 through 8, a one-piece adjustable discharge register 40 includes a number of air-directing vanes 50 integrally formed therein, at least two groups of which are interconnected at opposite ends by integrally-formed end-cap portions 42, thus forming two clamshell halves of the one-piece adjustable discharge register 40. The vane-and-end cap halves are interconnected with a frame portion 70, which is preferably of an open, box-like construction, for supporting a number of movable louvers 60 adapted for pivotal movement relative to the frame portion 70 and the rest of the one-piece register 40.

The end cap portions 42, along with the vanes 50, are integrally formed with, and interconnected to, the frame portion 70 by way of a series of living hinges 44, which are perhaps best seen in FIGS. 4 through 7. The living hinges 44 allow the integrally-formed end cap portions 42 and vanes 50 to be pivotally moved toward one another and toward the frame portion 70 during a simple, one-step assembly procedure, after which the end caps are interlockingly retained in their final use position shown in FIG. 6, by way of the interlocking engagement of an interlock pin or tab 48 on one of the end caps 42 into an interlock receptacle 46 on the other of the end caps. Such interlocking engagement of the interlock receptacles and pins 46 and 48, respectively, is preferably provided at each end of the discharge register 40.

Figure 6:
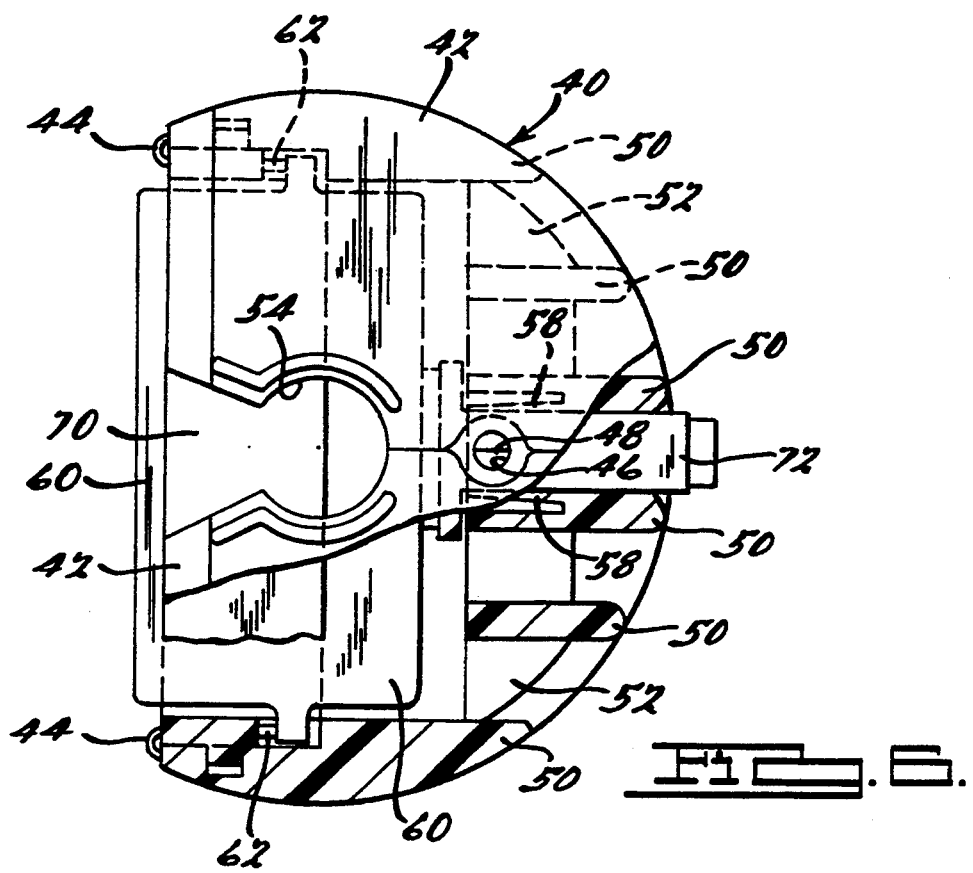
FIG. 6 is an end view of the assembled, exemplary one-piece adjustable air discharge register of FIG. 3, but with some outer portions broken away to illustrate various internal portions, some of which are shown in cross-section.

When the adjustable discharge register 40 is assembled in its final use configuration, as illustrated in FIG. 6, the end cap portions 42 at each end of the discharge register 40 include partial openings that form pivot receptacles 54, similar to those provided in the multi-piece prior art discharge register 18 shown in FIGS. 1 and 2, for allowing the finished discharge register 40 to be snapped onto pivots in a conventional air discharge opening in an interior panel, for example, with the discharge register 40 thereby being pivotally movable in the air discharge opening for first selective adjustment of the direction of discharge airflow in a first adjustment direction due to the deflection of the airflow by the vanes 50. The vanes 50 can be held in a parallel relationship with one another by way of cross-braces 52 as in the preferred exemplary embodiments illustrated in the drawings.

In a manner similar to that discussed above in connection with the first set of living hinges 44, the frame portion 70 is also integrally formed with, and pivotally interconnected with, the series of louvers 60, by way of a series of living hinges 62, which can be readily seen in FIGS. 4 through 7.

Also integrally formed in the one-piece discharge register 40 is a link member 66, which is integrally formed with, and hingedly interconnected with, the louver 60 by way of yet another series of living hinges 68, as perhaps best seen in FIGS. 4, 7 and 8.

In the embodiment of the one-piece adjustable discharge register 40 illustrated in FIGS. 3 through 8, a movable control knob 72 is integrally formed with the link member 66 in order to allow the operator to grasp or push on the control knob 72 and thereby cause movement of the pivotal louvers 60 in a second adjustment direction, with such adjustment in the second adjustment direction being independent of, and transverse to, the pivotal movement of the entire one-piece adjustable discharge register 40 in the first adjustment direction discussed above. The link member 66 also assures that the louvers 60 move in unison and remain in a generally parallel relationship with one another during adjustment of the air-directing louvers 60 in the second adjustment direction.

Figure 10:
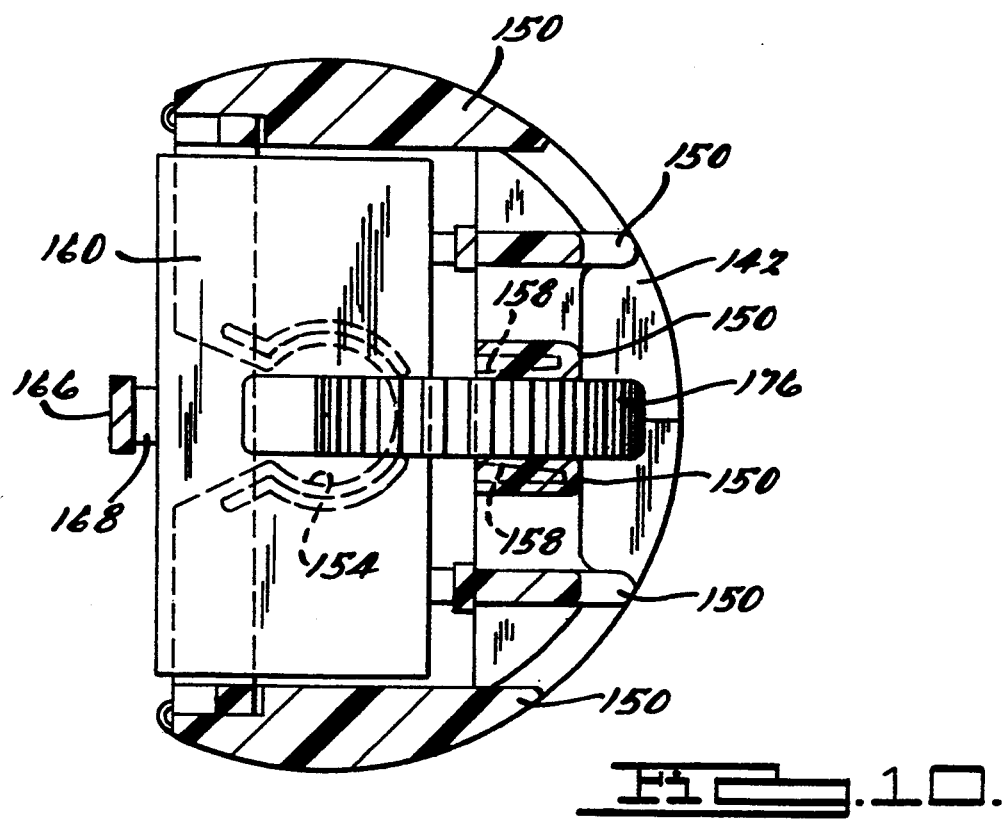
FIG. 10 is a cross-sectional view taken generally along line 10—10 of FIG. 9.

FIGS. 9 and 10 illustrate an alternate variation on the one-piece adjustable discharge register 40, wherein one-piece adjustable discharge register 140 has components that are identical with, or that at least functionally correspond to, the various components of the discharge register 40 shown in FIGS. 3 through 8. Thus such identical or corresponding components of the discharge register 140 are indicated by reference numerals similar to those of FIGS. 3 through 8, but having one-hundred prefixes.

In FIGS. 9 and 10, the one-piece adjustable discharge register 140 has a partially-circular control wheel 176 integrally formed with the middle of the louvers 160, and thus has its link member 166 formed on the opposite side of the louvers therefrom, such that pivoting movement of the control wheel 176, acting in conjunction with the hinged interlocking relationship of the louvers 160 by way of the link member 166, causes the louvers 160 to move in unison in their generally parallel relationship with respect to one another. Again, such movement is independent of the pivotal movement of the entire adjustable discharge member 140 for airflow adjustment in the first, opposite adjustment direction. In other respects, the one-piece, singularly-molded adjustable discharge register 140 is similar to the one-piece, singularly-molded adjustable discharge register 40 shown in FIGS. 3 through 8.

FIG. 11 illustrates a friction-producing feature of the present invention, which is applicable in any of the embodiments previously discussed herein, as well as in other embodiments of the present invention where it may be deemed necessary or desirable. In FIG. 11, the middle two vanes 50 of the adjustable discharge register 40 include medial portions thereof having deflectable fin-like friction clutch members 58 integrally formed therewith. Such friction clutch members 58 frictionally engage the control knob 70 (or the control wheel 176 in the discharge register 140) in order to provide sufficient friction on the control knob 72 to releasably hold the louvers in a desired preselected adjusted air-deflecting position. Depending upon the resiliency of the materials used and the amount of resilient "memory" exhibited by the living hinges 68 and 62 (discussed above), such friction clutch members 58 may not be needed in every installation. In installations where they are felt to be necessary or desirable, however, they can be easily integrally molded into the center or middle two vanes 50, along with the rest of a one-piece, integrally-molded adjustable discharge register according to the present invention.

In FIG. 12, the interlocking engagement of the interlock receptacle 46 and the interlock pin or tab 48, which cooperate with one another in order to retain the end cap portions 42 in their assembled, final use position are illustrated in more detail. Once the end-cap and vane clamshell halves are folded inwardly toward one another and toward the frame portion 70, they are snapped together to complete the simple, one-step assembly process.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein, without departing from the spirit and scope of the invention as defined in the following claims.

What is claimed is:

1. A one-piece adjustable air discharge register having a number of air-directing vanes therein, said discharge register being adapted for pivotal mounting in an air discharge opening in communication with an air supply duct for a first selective adjustment of discharge airflow between first and second positions in a first adjustment direction, said discharge register having a number of pivotally movable air-directing louvers therein for a second selective adjustment of discharge airflow between first and second positions in a second adjustment direction that is transverse to and independent of said first adjustment direction, said discharge register being a one-piece construction including an integral frame portion for supporting said movable louvers, a living hinge means integrally formed with said frame portion and said louvers, said living hinge means hingedly interconnecting said louvers with said frame portion for selective pivotal movement of said louvers relative to said frame portion in said second adjustment direction, a pair of end caps at each end of said vanes, a number of said vanes being interconnected by one of said end caps and integrally formed therewith at each end of said vanes in order to define a pair of vane-and-end cap assemblies, a second living hinge means integrally formed with said vanes, said assemblies being hingedly movable during said assembly generally toward each other and generally toward said frame portion to a final use position.

2. A one-piece adjustable air discharge register according to claim 1, further including a link member, and second living hinge means integrally formed with said link member and said louvers, said second living hinge means hingedly interconnecting said louvers with link members for maintaining said louvers in a generally parallel relationship relative to one another throughout said selective pivotal movement relative to said frame portion.

3. A one-piece adjustable air discharge register according to claim 1, wherein a number of said air-directing vanes are interconnected by an end cap, said vanes being integrally formed with said end cap, a third living hinge means being integrally formed with said vanes, said end cap and said frame portion for hinged pivotal movement of said vanes and end cap relative to said frame portion during assembly from a pre-assembly position to a final use position, and said register further including locking means for interlockingly retaining said end cap in said final use position.

4. A one-piece adjustable air discharge register according to claim 3, further including second locking means for interlockingly retaining said register in the air discharge opening for pivotal movement of said register relative to said discharge opening in said first adjustment direction.

5. A one-piece adjustable air discharge register according to claim 4, wherein the air discharge opening is in an interior member in a vehicle interior.

6. A one-piece adjustable air discharge register according to claim 1, wherein said register is an integrally molded device composed of a moldable plastic material.

7. A one-piece adjustable air discharge register having a number of air-directing vanes therein, said discharge register being adapted for pivotal mounting in an air discharge opening in communication with an air supply duct for a first selective adjustment of discharge airflow between first and second positions in a first adjustment direction, said discharge register having a number of pivotally movable air-directing louvers therein for a second selective adjustment of discharge airflow between first and second positions in a second adjustment direction that is transverse to and independent of said first adjustment direction, said discharge register being a one-piece construction including an integral frame portion for supporting said movable louvers, a living hinge means integrally formed with said frame portion and said louvers, said living hinge means hingedly interconnecting said louvers with said frame portion for selective pivotal movement of said louvers relative to said frame portion in said second adjustment direction, a number of said air-directing vanes being interconnected by an end cap, said vanes being integrally formed with said end cap, a second living hinge means being integrally formed with said vanes, said end cap and said frame portion for hinged pivotal movement of said vanes and end cap relative to said frame portion during assembly from a pre-assembly position to a final use position, and said register further including locking means for interlockingly retaining said end cap in said final use position, said register having a pair of said end caps at each end of said vanes, a number of said vanes being interconnected by one of said end caps at each end of said vanes in order to define a pair of vane-and-end cap assemblies, said assemblies being hingedly movable during said assembly generally toward each other and generally toward said frame portion to said final use position.

8. A one-piece adjustable air discharge register according to claim 2, further including a lateral control means integrally formed with said link member, said lateral control means being movable to cause movement of said link member and to thereby cause pivotal movement of said louvers in said second adjustment direction.

9. A one-piece adjustable air discharge register according to claim 2, further including a rotary control means integrally formed with one of said louvers, said rotary control means being pivotally movable to cause pivotal movement of said one louver and to thereby cause pivotal movement of the rest of said louvers by way of said interconnection with said link member.

10. A one-piece adjustable air discharge register according to claim 1, further including friction means for releasably maintaining said louvers in any of a number of preselected adjusted positions in said second adjustment direction.

11. A one-piece adjustable air discharge register having a number of air-directing vanes therein, said discharge register being adapted for pivotal mounting in an air discharge opening in communication with an air supply duct for a first selective adjustment of discharge airflow between first and second positions in a first adjustment direction, said discharge register having a number of pivotally movable air-directing louvers therein for a second selective adjustment of discharge airflow between first and second positions in a second adjustment direction that is transverse to and independent of said first adjustment direction, said discharge register being a one-piece construction including an integral frame portion for supporting said movable louvers, a first living hinge means integrally formed with said frame portion and said louvers, said first living hinge means hingedly interconnecting said louvers with said frame portion for selective pivotal movement of said louvers relative to said frame portion in said second adjustment direction, a link member, second living hinge means integrally formed with said link member and said louvers, said second living hinge means hingedly interconnecting said louvers with link member for maintaining said louvers in a generally parallel relationship relative to one another throughout said selective pivotal movement relative to said frame portion, an end cap, a number of said air-directing vanes being interconnected by said end cap, said vanes being integrally formed with said end cap, a third living hinge means being integrally formed with said vanes, said end cap and said frame portion for hinged pivotal movement of said vanes and end cap relative to said frame portion during assembly from a pre-assembly position to a final use position, said register further including first locking means for interlockingly retaining said end cap in said final use position, and second locking means for interlockingly retaining said register in the air discharge opening for pivotal movement of said register relative to said discharge opening in said first adjustment direction, said register further including a pair of said end caps at each end of said vanes, a number of said vanes being interconnected by one of said end caps at each end of said vanes in order to define a pair of vane-and-end cap assemblies, said assemblies being hingedly movable during said assembly generally toward each other and generally toward said frame portion to said final use position.

12. A one-piece adjustable air discharge register according to claim 11, wherein the air discharge opening is in an interior member in a vehicle interior.

13. A one-piece adjustable air discharge register according to claim 11, wherein said register is an integrally molded device composed of a moldable plastic material.

14. A one-piece adjustable air discharge register according to claim 11, further including a lateral control means integrally formed with said link member, said lateral control means being movable to cause movement of said link member and to thereby cause pivotal movement of said louvers in said second adjustment direction.

15. A one-piece adjustable air discharge register according to claim 11, further including a rotary control means integrally formed with one of said louvers, said rotary control means being pivotally movable to cause pivotal movement of said one louver and to thereby cause pivotal movement of the rest of said louvers by way of said interconnection with said link member.

16. A one-piece adjustable air discharge register according to claim 11, further including friction means for releasably maintaining said louvers in any of a number of preselected adjusted positions in said second adjustment direction.

17. A one-piece adjustable air discharge register having a number of air-directing vanes therein, said discharge register being adapted for pivotal mounting in an air discharge opening in a vehicle interior for a first selective adjustment of discharge airflow between first and second positions in a first adjustment direction, said discharge register having a number of pivotally movable air-directing louvers therein for a second selective adjustment of discharge airflow between first and second positions in a second adjustment direction that is transverse to and independent of said first adjustment direction, said discharge register being a one-piece construction including an integral frame portion for supporting said movable louvers, a first living hinge means integrally formed with said frame portion and said louvers, said first living hinge means hingedly interconnecting said louvers with said frame portion for selective pivotal movement of said louvers relative to said frame portion in said second adjustment direction, a link member, second living hinge means integrally formed with said link member and said louvers, said second living hinge means hingedly interconnecting said louvers with link member for maintaining said louvers in a generally parallel relationship relative to one another throughout said selective pivotal movement relative to said frame portion, a pair of end caps at each end of said vanes, a number of said air-directing vanes being interconnected by one of said end caps at each end of said vanes in order to define a pair of vane-and-end cap assemblies, said vanes being integrally formed with said end caps, a third living hinge means being integrally formed with said vanes, said end cap and said frame portion for hinged pivotal movement of said vane-and-end cap assemblies generally toward each other and generally toward said frame portion during assembly from a pre-assembly position to a final use position, said register further including first locking means for interlockingly retaining said end cap in said final use position, second locking means for interlockingly retaining said register in the air discharge opening for pivotal movement of said register relative to said discharge opening in said first adjustment direction, and friction means for releasably maintaining said louvers in any of a number of preselected adjusted positions in said second adjustment direction.

18. A one-piece adjustable air discharge register according to claim 17, wherein said register is an integrally molded device composed of a moldable plastic material.

19. A one-piece adjustable air discharge register according to claim 17, further including a lateral control means integrally formed with said link member, said lateral control means being movable to cause movement of said link member and to thereby cause pivotal movement of said louvers in said second adjustment direction.

20. A one-piece adjustable air discharge register according to claim 17, further including a rotary control means integrally formed with one of said louvers, said rotary control means being pivotally movable to cause pivotal movement of said one louver and to thereby cause pivotal movement of the rest of said louvers by way of said interconnection with said link member.

* * * * *